(12) United States Patent
Sobbi

(10) Patent No.: US 11,975,578 B2
(45) Date of Patent: May 7, 2024

(54) ELECTRICAL CONNECTOR MOUNTING BRACKET FOR A TRAILER HITCH RECEIVER

(71) Applicant: 2371667 Alberta Inc., Calgary (CA)

(72) Inventor: Bahman Sobbi, Calgary (CA)

(*) Notice: Subject to any disclaimer, the term of this patent is extended or adjusted under 35 U.S.C. 154(b) by 409 days.

(21) Appl. No.: 17/485,828

(22) Filed: Sep. 27, 2021

(65) Prior Publication Data

US 2023/0095311 A1 Mar. 30, 2023

(51) Int. Cl.
*B60D 1/58* (2006.01)
*B60D 1/62* (2006.01)
*B60D 1/64* (2006.01)

(52) U.S. Cl.
CPC ............... *B60D 1/58* (2013.01); *B60D 1/62* (2013.01); *B60D 1/64* (2013.01)

(58) Field of Classification Search
CPC ..................................... B60D 1/58; B60D 1/62
See application file for complete search history.

(56) References Cited

U.S. PATENT DOCUMENTS

| | | | | |
|---|---|---|---|---|
| 5,288,094 | A * | 2/1994 | Putnam | B60D 1/62 D7/619.1 |
| 5,593,170 | A * | 1/1997 | Chiu | B60D 1/60 439/35 |
| 6,080,014 | A * | 6/2000 | Steiler | H01R 13/73 439/574 |
| 8,215,656 | B1 * | 7/2012 | Kaminski | B60D 1/64 439/35 |
| 9,016,707 | B2 * | 4/2015 | Bowe | B60D 1/62 280/420 |
| 10,355,401 | B1 * | 7/2019 | Billings | B60D 1/60 |
| 2010/0213687 | A1 * | 8/2010 | Mcdaniel | B60D 1/40 280/491.2 |
| 2013/0049327 | A1 * | 2/2013 | Bowe | B60D 1/64 280/422 |

* cited by examiner

*Primary Examiner* — Kevin Hurley
(74) *Attorney, Agent, or Firm* — Lewellyn Law, PLLC; Stephen Lewellyn

(57) ABSTRACT

A mounting bracket for attaching an electrical coupling of trailer light electrical system to the hitch receiver tube of a towing vehicle is described. The mounting bracket removably attaches to the receiver tube such that the bracket does not interfere with the tube opening and has a electrical coupling mount flange that is located sideways from the receiver tube in a cantilever like fashion.

8 Claims, 3 Drawing Sheets

ELECTRICAL CONNECTOR MOUNTING BRACKET FOR A TRAILER HITCH RECEIVER

FIELD OF THE INVENTION

The present disclosure relates to new and useful improvements in brackets for mounting electrical couplings to trailer hitch receiver tubes.

BACKGROUND OF THE INVENTION

It is a requirement for towed vehicles, such as, for example, a trailer to having signal lights, including break and turn signals. In some instances, the towed vehicle may also have brakes. To operate the signal lights and/or brakes of the towed vehicle, the electrical system of the towed vehicle must be connected to the electrical system of the towing vehicle. The electrical systems are connected by a pair of mating plugs or sockets. Often the socket connected to the towing vehicle is left loosely hanging from the back end of the vehicle near the trailer hitch receiver.

There are many different bracket configurations that exist for the purpose of securing the towing vehicle socket to the towing vehicle. U.S. Pat. No. 9,016,707 discloses such a mounting bracket that mounts an electrical coupling to a trailer hitch receiver tube. While this mounting bracket meets its respective objectives and requirements, a drawback is the propensity of the bracket to interfere with the hitch receiver tube opening because it is mounted over the front of the hitch receiver tube and can shift and block the opening. Accordingly, there is a need for a new and improved mounting bracket that attaches to the hitch receiver tube without interfering with the tube opening.

SUMMARY OF THE INVENTION

Embodiments of the invention provide an electrical coupling mounting bracket for attachment to a hitch receiver tube that does not interfere with the receiver tube opening and which positions an electrical coupling off to the side of the receiver tube.

In general, in one aspect, an electrical coupling mounting bracket for a hitch receiver tube is provided. The electrical coupling mounting bracket has a U-shaped clamp having a first and second upstanding legs connected at corresponding ends by a bridge. The first and second upstanding legs together with the bridge define a space conforming to the cross-section of the hitch receiver tube. Each of first and second upstanding legs having an outwardly extending leg flange at an end opposite of the bridge. And the bridge is configured for abutment to a first flat of the hitch receiver tube.

The mounting bracket further includes a sidearm that is separate from the U-shaped clamp. The sidearm is removably attached to said U-shaped clamp so as to extend in a cantilevered fashion in a sideways direction away from the U-shaped clamp. The sidearm has a broad face that is configured for abutment to a second flat of the hitch receiver tube that is located opposite from the first flat of the hitch receiver tube. An electrical coupling mounting flange is on the sidearm at a cantilevered location located sideways relative to the U-shaped clamp. The electrical coupling mounting flange extending generally perpendicular to broad face of the sidearm. A pair of bolt holes, one in each of the leg flanges, are aligned with a pair of bolt holes in the sidearm. Two bolts extend through the bolt holes between the leg flanges and the sidearm to removably attach the sidearm to the U-shaped clamp and tighten the bridge of the U-shaped clamp and the broad face of the sidearm against the first and second flats of the hitch receiver tube with a bolt on opposite sides of the hitch receiver tube, thereby securing the bracket to the hitch receiver tube.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

For a better understanding of the invention, its operating advantages and the specific objects attained by its uses, reference should be had to the accompanying drawings and descriptive matter in which there are illustrated embodiments of the invention.

BRIEF DESCRIPTION OF THE DRAWINGS

The following drawings illustrate by way of example and are included to provide further understanding of the invention for the purpose of illustrative discussion of the embodiments of the invention. No attempt is made to show structural details of the embodiments in more detail than is necessary for a fundamental understanding of the invention, the description taken with the drawings making apparent to those skilled in the art how the several forms of the invention may be embodied in practice. Identical reference numerals do not necessarily indicate an identical structure. Rather, the same reference numeral may be used to indicate a similar feature of a feature with similar functionality. In the drawings.

DETAILED DESCRIPTION OF THE INVENTION

Figure 1:
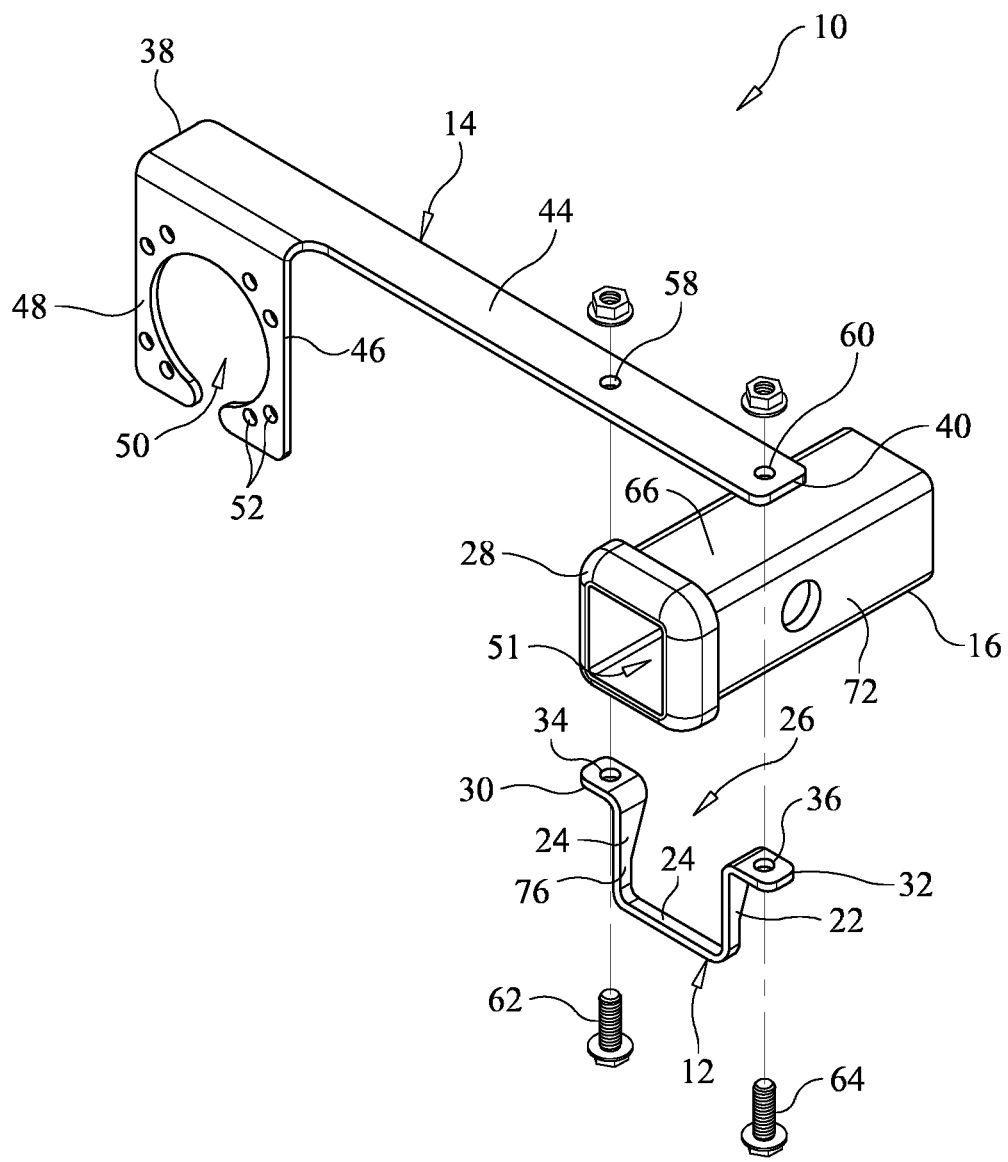
FIG. 1 is a diagrammatic, exploded perspective view of an electrical coupling mounting bracket for a hitch receiver tube constructed in accordance with the principles of at least one embodiment of the invention.
Figure 2:
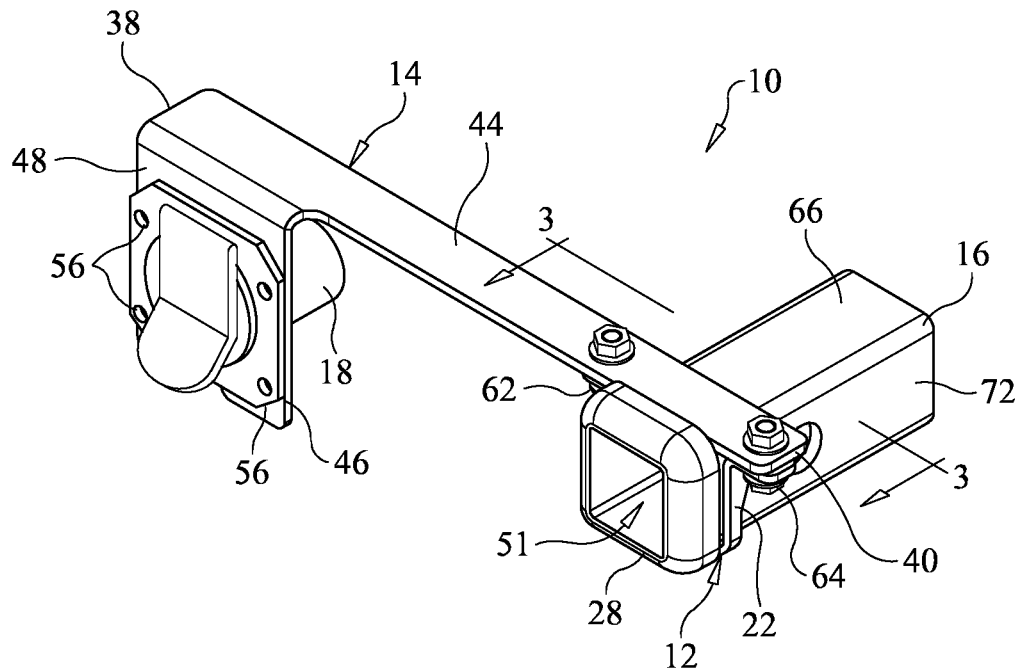
FIG. 2 is a diagrammatic, perspective view of an electrical coupling mounting bracket for a hitch receiver tube mounted to a hitch receiver tube in accordance with the principles of at least one embodiment of the invention.
Figure 3:
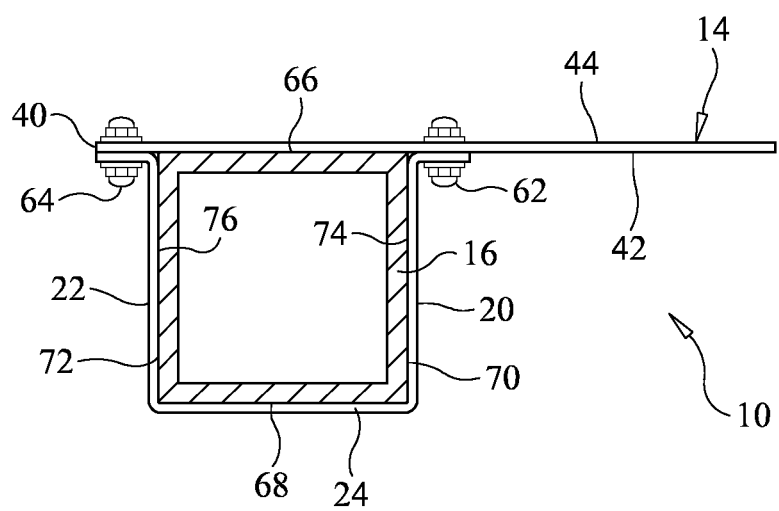
FIG. 3 is a cross-sectional view taken along line 3-3 in FIG. 2.

With reference to the drawings in which like reference characters designate like or corresponding parts throughout the various views, and with reference to FIGS. 1-3, an electrical coupling mounting bracket in accordance with an embodiment of the present invention is indicated generally at 10.

The bracket 10 includes a clamp 12 and a sidearm 14, which collectively are secured to a hitch receiver tube 16 for the purpose of mounting an electrical coupling or socket 18 to the hitch receiver tube at a sideways direction therefrom. Conventionally, the electrical coupling or socket 18 is for connecting the electrical system of a towing vehicle (not shown) to the electrical system of a towed vehicle (not shown) for controlling lights, brakes, etc., of the towed vehicle.

The clamp 12 is U-shaped and includes a pair of upstanding legs 20 and 22 that are connected at corresponding ends by a bridge 24. The legs 20 and 22 together with the bridge define a space 26 that conforms to the cross-section of the hitch receiver tube 16 so as to partially encircle the exterior of the tube at an inwardly disposed location relative from the lip 28 of the hitch receiver tube. Each leg 20 and 22 has an end opposite of the end connected by the bridge 24 and this end is provided with an outwardly extending leg flange 30 and 32, respectively, formed generally perpendicular to the leg. Each leg flange 30 and 32 comprises a bolt hole 34 and 36, respectively.

The sidearm 14 has opposite ends 38 and 40 and opposite broad faces 42 and 44 that extend between the opposite ends. An electrical coupling mounting flange 46 is on the sidearm 14 at end 38 to be located sideways relative to the U-shaped clamp 12 and the hitch receiver tube 16. The length of the sidearm 14 is selected as needed for the desired sideways positioning of the mounting flange 46.

The mounting flange 46 has a broad face 48 that is arranged generally perpendicular to the broad face 42 and generally parallel to the opening 51 of the hitch receiver tube 16. The mounting flange 46 includes a socket positioning opening 50 through the broad face 48 and a plurality of bolt holes 52 disposed around the opening. The socket positioning opening 50 can be sized to mate with a standard plug or socket 18 of a trailer electrical connection, such as, for example a 7-pin cylindrical socket. The socket 18 is secured to the mounting flange 46 by bolts or threaded fasteners 56.

The sidearm 14 further includes a pair of bolt holes 58 and 60 that are arranged to align with bolt holes 34 and 36. The sidearm 14 is removably secured to the U-shaped clamp 12 by two bolts 62 and 64 which extend through the bolt holes of the U-shaped clamp and sidearm. The bolts 62 and 64 are secured and tightened to attach the mounting bracket 10 to the hitch receiver tube 16 with the bridge 24 of the U-shaped clamp 12 and the broad face 42 of the sidearm 14 against opposite flats 66 and 68 of the hitch receiver tube with a bolt on opposite sides the hitch receiver tube 16.

In embodiments, each upstanding leg 20 and 22 can include flat surfaces 74 and 76, respectively, to correspond with the flats 70 and 72. In embodiments, the distance between flat surfaces 74 and 76 can be selected so that the surfaces abut against the flats 70 and 72 or provide a slight gap therebetween (not shown).

Figure 4:
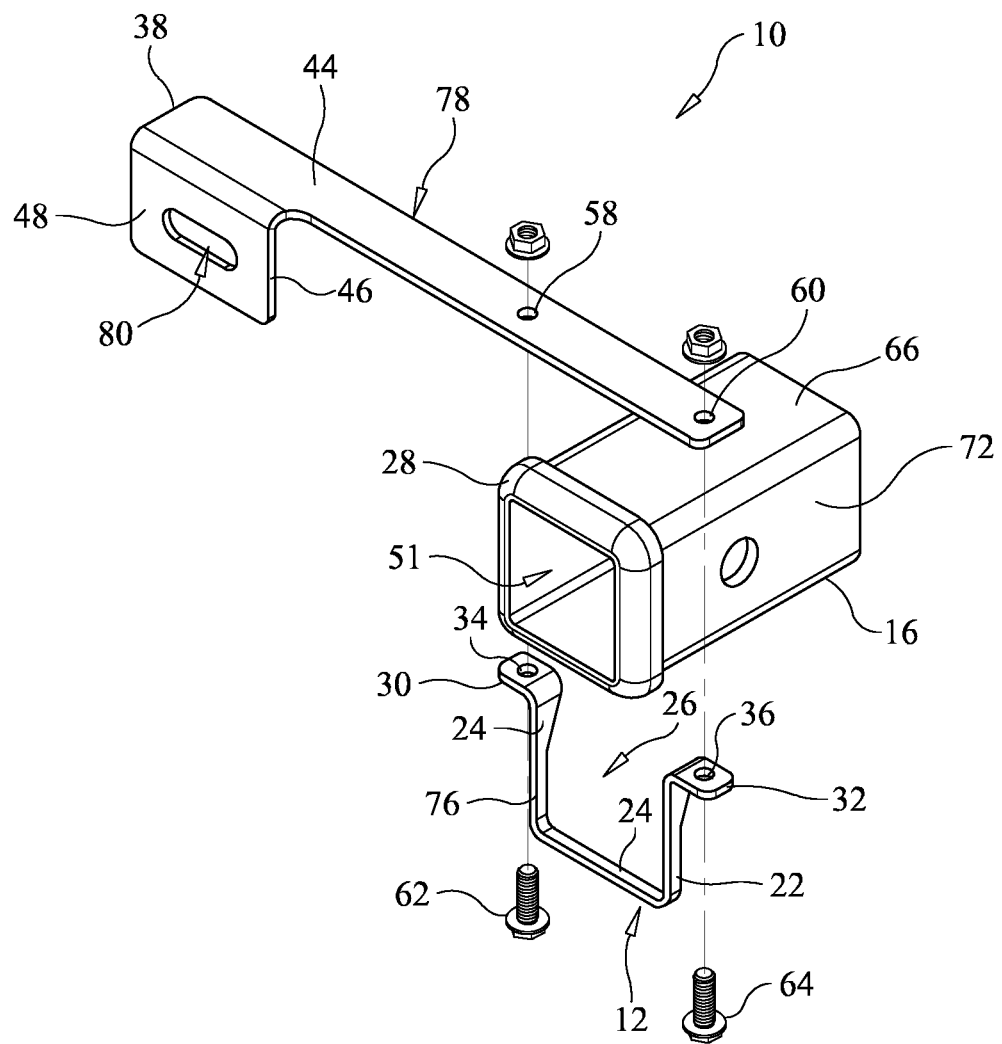
FIG. 4 is a diagrammatic, exploded perspective view of an electrical coupling mounting bracket for a hitch receiver tube constructed in accordance with the principles of at another embodiment of the invention.

In FIG. 4 there is shown an alternative embodiment of the sidearm. A shown, sidearm 78 has a similar construction to sidearm 14 discussed above. The primary difference is found in the socket positioning opening 80 which is configured for receiving a flat plug or socket (not shown).

While the invention has been particularly shown and described with respect to the illustrated embodiments thereof, it will be understood by those skilled in the art that the foregoing and other changes in form and details may be made therein without departing from the spirit and scope of the invention.

What is claimed is:

1. An electrical coupling mounting bracket for a hitch receiver tube, the electrical coupling mounting bracket comprising:
   a U-shaped clamp having a first and second upstanding legs connected at corresponding ends by a bridge, the first and second upstanding legs together with the bridge define a space conforming to the cross-section of the hitch receiver tube, each of first and second upstanding legs having an outwardly extending leg flange at an end opposite of the bridge, the bridge configured for abutment to a first flat of the hitch receiver tube;
   a sidearm separate from the U-shaped clamp, the sidearm being removably attached to said U-shaped clamp so as to extend in a cantilevered fashion in a sideways direction away from the U-shaped clamp, the sidearm having a broad face configured for abutment to a second flat of the hitch receiver tube that is located opposite from the first flat of the hitch receiver tube;
   an electrical coupling mounting flange on the sidearm at a cantilevered location located sideways relative to the U-shaped clamp, the electrical coupling mounting flange extending generally perpendicular to broad face of the sidearm;
   a pair of bolt holes, one in each of the leg flanges, which are aligned with a pair of bolt holes in the sidearm; and
   two bolts which extend through the bolt holes between the leg flanges and the sidearm to removably attach the sidearm to the U-shaped clamp and tighten the bridge of the U-shaped clamp and the broad face of the sidearm against the first and second flats of the hitch receiver tube with a bolt on opposite sides of the hitch receiver tube.

2. The electrical coupling mounting bracket of claim 1, wherein the electrical coupling mounting flange having a socket positioning opening.

3. The electrical coupling mounting bracket of claim 2, wherein the socket positioning opening is sized to receive a cylindrical socket.

4. The electrical coupling mounting bracket of claim 3, wherein the socket positioning opening is sized to receive a flat socket.

5. An electrical coupling mounting bracket for a hitch receiver tube, the electrical coupling mounting bracket comprising:
   a U-shaped clamp having a first and second upstanding legs connected at corresponding ends by a bridge, the first and second upstanding legs together with the bridge define a space conforming to the cross-section of the hitch receiver tube, each of first and second upstanding legs having an outwardly extending leg flange at an end opposite of the bridge, the bridge configured for abutment to a first flat of the hitch receiver tube at a location along the hitch receiver tube from a lip of the hitch receiver tube;
   a sidearm separate from the U-shaped clamp, the sidearm being removably attached to said U-shaped clamp so as to extend in a cantilevered fashion in a sideways direction away from the U-shaped clamp, the sidearm having opposite first and second ends and opposite first and second broad faces extending between the first and second ends thereof, the first broad face being configured for abutment to a second flat of the hitch receiver tube at a location along the hitch receiver tube from a lip of the hitch receiver tube, the second flat being opposite from the first flat of the hitch receiver tube;

an electrical coupling mounting flange on the sidearm at a cantilevered location located sideways relative to the U-shaped clamp and approximate the second end of the sidearm, the electrical coupling mounting flange having a broad surface that is generally perpendicular to broad face of the sidearm, the electrical coupling mounting flange further having a socket positioning opening through the broad surface thereof;

a pair of bolt holes, one in each of the leg flanges, which are aligned with a pair of bolt holes in the sidearm; and two bolts which extend through the bolt holes between the leg flanges and the sidearm to removably attach the sidearm to the U-shaped clamp and tighten the bridge of the U-shaped clamp and the broad face of the sidearm against the first and second flats of the hitch receiver tube with a bolt on opposite sides of the hitch receiver tube.

6. The electrical coupling mount bracket of claim 5, wherein the socket positioning opening is sized to receive a cylindrical socket.

7. The electrical coupling mounting bracket of claim 5, wherein the socket positioning opening is sized to receive a flat socket.

8. The electrical coupling mounting bracket of claim 5, the first and second upstanding legs each have a flat surface that corresponds with third and fourth flats, respectively, of hitch receiver tube.

* * * * *